(12) United States Patent
Li (10) Patent No.: US 11,398,225 B2
(45) Date of Patent: Jul. 26, 2022

(54) METHOD AND APPARATUS FOR CONTROLLING DEVICE

(71) Applicant: BEIJING XIAOMI INTELLIGENT TECHNOLOGY CO., LTD., Beijing (CN)

(72) Inventor: Fuxin Li, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 225 days.

(21) Appl. No.: 16/583,235

(22) Filed: Sep. 25, 2019

(65) Prior Publication Data

US 2020/0251101 A1 Aug. 6, 2020

(30) Foreign Application Priority Data

Jan. 31, 2019 (CN) .......................... 201910100989.6

(51) Int. Cl.
| | | |
|---|---|---|
| *G10L 15/30* | (2013.01) | |
| *G10L 15/18* | (2013.01) | |
| *G10L 15/22* | (2006.01) | |
| *G10L 15/32* | (2013.01) | |
| G10L 15/08 | (2006.01) | |
| H04L 12/28 | (2006.01) | |
| G10L 15/06 | (2013.01) | |

(52) U.S. Cl.
CPC .......... *G10L 15/1815* (2013.01); *G10L 15/22* (2013.01); *G10L 15/30* (2013.01); *G10L 15/32* (2013.01); *G10L 2015/0635* (2013.01); *G10L 2015/088* (2013.01); *G10L 2015/223* (2013.01); *H04L 12/2816* (2013.01); *H04L 12/2821* (2013.01)

(58) Field of Classification Search
None
See application file for complete search history.

(56) References Cited

U.S. PATENT DOCUMENTS

| | | | | |
|---|---|---|---|---|
| 6,052,666 A | * | 4/2000 | Diehl ...................... | G10L 13/00 704/270 |
| 6,408,272 B1 | * | 6/2002 | White ...................... | G10L 15/30 704/270.1 |
| 8,340,975 B1 | * | 12/2012 | Rosenberger ........... | G10L 15/22 704/275 |

(Continued)

OTHER PUBLICATIONS

Extended European Search Report in the European Application No. 19200596.5, dated Mar. 20, 2020, (8p).

*Primary Examiner* — Richard Z Zhu
(74) *Attorney, Agent, or Firm* — Arch & Lake LLP (57) ABSTRACT

A method and apparatus for controlling a device are disclosed. The method includes: performing voice recognition on a received sound signal to obtain a voice recognition result; determining keywords using the voice recognition result; determining a target intelligent device having attribute information matched with the keywords from intelligent devices, where relationships between the intelligent devices and attribute information of the intelligent devices are constructed in advance, and the attribute information characterizes a device operation provided by the intelligent device corresponding to the attribute information; and controlling the target intelligent device to perform an operation indicated by the voice recognition result.

3 Claims, 6 Drawing Sheets

Candidate intelligent devices having attribute information matched with the keywords are determined from the intelligent devices — 1304

In responsive to that there is an intelligent device in the candidate intelligent devices which has executed an operation in a preset reference time period, the intelligent device is determined as the target intelligent device — 1305

(56) References Cited

U.S. PATENT DOCUMENTS

| | | | | |
|---|---|---|---|---|
| 8,831,957 | B2* | 9/2014 | Taubman | G10L 15/183 704/275 |
| 9,472,205 | B2* | 10/2016 | Kolavennu | G10L 21/16 |
| 2002/0069063 | A1* | 6/2002 | Buchner | H04L 12/282 704/270 |
| 2003/0144845 | A1* | 7/2003 | Lee | G10L 15/22 704/E15.04 |
| 2003/0187659 | A1* | 10/2003 | Cho | H04L 12/2803 704/275 |
| 2014/0167931 | A1 | 6/2014 | Lee et al. | |
| 2015/0088518 | A1* | 3/2015 | Kim | G10L 15/22 704/251 |
| 2015/0154976 | A1* | 6/2015 | Mutagi | H04L 12/281 704/275 |
| 2016/0155443 | A1 | 6/2016 | Khan et al. | |
| 2017/0103755 | A1* | 4/2017 | Jeon | H04L 12/2821 |
| 2017/0133011 | A1* | 5/2017 | Chen | H04L 12/282 |
| 2017/0249940 | A1 | 8/2017 | Chen et al. | |
| 2018/0233136 | A1* | 8/2018 | Torok | G10L 15/22 |
| 2018/0240331 | A1 | 8/2018 | Lee et al. | |
| 2019/0005960 | A1* | 1/2019 | Naravanekar | G06F 3/167 |
| 2019/0089552 | A1* | 3/2019 | Arikawa | H04L 12/2821 |
| 2019/0342112 | A1* | 11/2019 | Li | H04L 12/66 |
| 2020/0106632 | A1* | 4/2020 | Lewis | H04L 67/125 |

* cited by examiner

METHOD AND APPARATUS FOR CONTROLLING DEVICE

CROSS-REFERENCE TO RELATED APPLICATION

The present application is based upon and claims benefit of Chinese Patent Application No. 201910100989.6, filed on Jan. 31, 2019, the contents of which are hereby incorporated by reference in its entirety for all purposes.

TECHNICAL FIELD

The disclosure relates to the field of computer technology, and more particularly to a method and an apparatus for controlling a device.

BACKGROUND

Two hands can be freed from operation by voice interaction. For example, the user can control an intelligent lamp in the house to be turned on or turned off by voice control without the manual operation of the user. Therefore, the voice interaction is favored by more and more users. Also, a high intelligent level of the voice interaction is required by the user.

SUMMARY

The present disclosure provides a method, an apparatus and a non-transitory computer readable storage medium for controlling a device.

According to a first aspect of the disclosure, a method for controlling a device is provided, which includes the following operations.

Voice recognition is performed on a received sound signal to obtain a voice recognition result. One or more keywords suing the voice recognition result are determined. A target intelligent device having attribute information matched with the one or more keywords is determined from intelligent devices. Relationships between the intelligent devices and attribute information of the intelligent devices are constructed in advance, and the attribute information characterizes a device operation provided by the intelligent device corresponding to the attribute information. The target intelligent device is controlled to perform an operation indicated by the voice recognition result.

According to a second aspect of the examples of the disclosure, an apparatus for controlling a device is provided, which includes a processor and a memory. The memory is configured to store processor-executable instructions.

The processor is configured to: perform voice recognition on a received sound signal to obtain a voice recognition result; determine one or more keywords using the voice recognition result; determine a target intelligent device having attribute information matched with the one or more keywords from intelligent devices, where relationships between the intelligent devices and attribute information of the intelligent devices are constructed in advance, and the attribute information characterizes a device operation provided by the intelligent device corresponding to the attribute information; and control the target intelligent device to execute an operation indicated by the voice recognition result.

According to a third aspect of the examples of the disclosure, a non-transitory computer readable storage medium is provided. Instructions in the storage medium, when being executed by a processor, cause the processor to perform: performing voice recognition on a received sound signal to obtain a voice recognition result; determining one or more keywords using the voice recognition result; determining a target intelligent device having attribute information that is matched with the one or more keywords from intelligent devices, where relationships between the intelligent devices and attribute information of the intelligent devices are constructed in advance, and the attribute information characterizes a device operation provided by the intelligent device corresponding to the attribute information; and controlling the target intelligent device to perform an operation indicated by the voice recognition result.

It should be understood that the above general descriptions and the following detailed descriptions are only exemplary and explanatory, and are not intended to limit the disclosure.

BRIEF DESCRIPTION OF DRAWINGS

The accompanying drawings, as a part of the specification, are incorporated into the specification, and are used to illustrate the examples conforming to the disclosure, and interpret the principle of the disclosure in conjunction with the specification.

DETAILED DESCRIPTION

Examples are illustrated in detail here, and are illustrated in the accompanying drawings. In a case that the following description is given with reference to the accompanying drawings, the same numbers in different drawings represent the same or similar elements unless otherwise represented. The implementations described in the following examples do not represent all implementations conforming to the disclosure. Instead, the implementations are merely examples of apparatuses and methods conforming to some aspects of the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise.

It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
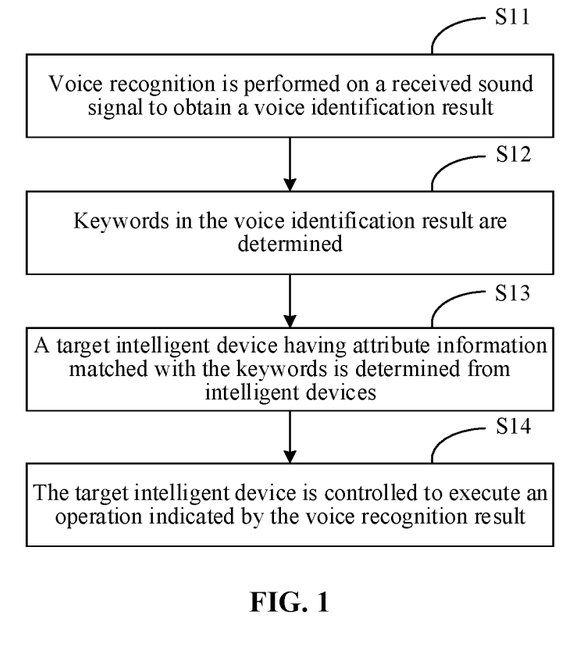
FIG. 1 is a flow chart of a method for controlling a device according to an example.

FIG. 1 is a flow chart of a method for controlling a device according to an example. As shown in FIG. 1, the method may be applied to a control device, such as a mobile phone, a tablet computer, an intelligent loudspeaker box, and a control device capable of controlling an intelligent device and the like, which is not limited in the disclosure. A method for controlling a device according to an example of the disclosure includes the following S11 to S14.

At S11, voice recognition is performed on a received sound signal to obtain a voice recognition result.

At S12, one or more keywords are determined using the voice recognition result.

At S13, a target intelligent device having attribute information matched with the one or more keywords is determined from one or more intelligent devices.

Relationships between the intelligent devices and attribute information of the intelligent devices are constructed in advance. The attribute information is used for characterizing an operation provided by the intelligent device corresponding to the attribute device.

At S14, the target intelligent device is controlled to execute an operation indicated by the voice recognition result.

According to the example of the disclosure, the target intelligent device having the attribute information matched with the one or more keywords is determined from the intelligent devices when the sound signal is received, and the target intelligent device is controlled to execute the operation indicated by the voice recognition result, thereby improving the intelligent level of the voice interaction.

The intelligent device may be an intelligent device which can be controlled by a control device, and may also be the control device (that is, if a control instruction is used for the control device, the control device may execute the control instruction for control). For example, the intelligent device may include a variety of intelligent devices which are authorized to be controlled by the control device. In an exemplary application scenario, a user may authorize a control device (such as a mobile phone and an intelligent loudspeaker box) thereof to control multiple intelligent devices. For example, the user authorizes the intelligent loudspeaker box thereof to control a sweeping robot, an air purifier and a bedside lamp. In this application example, relationships between intelligent devices and attribute information of the intelligent devices are constructed in advance. The attribute information is used for characterizing an operation provided by the intelligent device corresponding to the attribute information. The attribute information may be operable attribute information of the intelligent device. That is, the operations provided by the intelligent device all may be taken as the attribute information of the intelligent device. The operation provided by the intelligent device may include an operation (such as a sweeping operation provided by a sweeper) corresponding to a functions and/or a property provided by the intelligent device, and may also include an operation (such as a charging operation provided by the sweeper) or the like of the intelligent device for guaranteeing the normal operation thereof.

Further, the constructed relationships, as a knowledge base, may be stored at the control device (such as a mobile phone and a notebook computer), and may also be stored at a server. The control device may acquire information on the relationships from the server corresponding to the control device when requiring the relationships.

For example, relationships between sweeping robots and attribute information of the sweeping robots are constructed in advance by the intelligent loudspeaker box of the user, and the attributes (i.e., the provided operations) of the sweeping robot may include but be not limited to sweeping, speed adjustment, electric quantity information query and the like. Relationships between the air purifiers and attribute information of the air purifiers are constructed in advance by the intelligent loudspeaker box of the user, and the attribute information (i.e., the provided operations) of the air purifier may include but be not limited to: air pm2.5 query, air humidity query and purification mode switch and the like. Relationships between the bedside lamps and attribute information of the beside lamps are constructed in advance by the intelligent loudspeaker box of the user, the attribute information (i.e., the provided operations) of the bedside lamp may include but be not limited to a turn-on operation, a turn-off operation and luminance adjustment and the like.

It should be noted that the same piece of attribute information of the intelligent device may be expressed in multiple expression manners, and the multiple expression manners are used to express the same piece of attribute information. With taking the sweeping robot as an example, sweeping, cleaning, clearing and the like may belong to the attribute information of sweeping. How to parse multiple pieces of attribute information in multiple expression manners into attribute information corresponding to the multiple pieces of attribute information is not limited in this example of the disclosure.

In this application example, the user may control one or more intelligent devices by uttering a voice. For example, a voice control instruction uttered by the user is "sweep the bedroom". Upon the reception of a sound signal, the intelligent loudspeaker box of the user may perform voice recognition on the sound signal to obtain a voice recognition result. The intelligent loudspeaker box of the user may determine keywords (sweep and bedroom) in the voice recognition result. The intelligent loudspeaker box of the user may determine, according to the keywords (sweep and bedroom), a target intelligent device having attribute information matched with the two keywords (sweep and bedroom) from the sweeping robot, the air purifier and the bedside lamp. In the relationships between intelligent devices and attribute information of the intelligent devices constructed in advance by the intelligent loudspeaker box of the user, the attribute information of the sweeping robot includes "sweep", and the attribute information of other intelligent devices than the sweeping robot does not include "sweep". The intelligent loudspeaker box of the user may determine that a to-be-controlled target intelligent device in the sweeping robot, the air purifier and the bedside lamp controlled by the intelligent loudspeaker box is the sweeping robot. The intelligent loudspeaker box of the user may control the sweeping robot to execute the operation indicated by the voice recognition result, for example, the intelligent loudspeaker box of the user controls the sweeping robot to sweep the bedroom.

The control device may directly send a control instruction to the target intelligent device, to control the target intelligent device to execute the operation indicated by the voice recognition result. Alternatively, the control device may also send a control instruction to a server, and the server sends the control instruction to the target intelligent device, to control the target intelligent device to execute the operation indicated by the voice recognition result.

In this way, even though no explicit execution main body is included in the control instruction sent by the user in the voice form, and the meaning of the control instruction is unclear, the control device can accurately recognize a control intention of the user to improve the intelligent level of the voice interaction.

In a possible implementation, the control device may be a mobile phone, a tablet computer, an intelligent loudspeaker box and the like. For convenience of explanation, the mobile phone is taken as an example of the control device below.

As shown in FIG. 1, in S11, voice recognition is performed on a received sound signal to obtain a voice recognition result.

For example, a user sends a voice control instruction, and a mobile phone of the user may perform voice recognition on the received sound signal to obtain a voice recognition result. For example, the voice recognition is performed on the received sound signal with automatic speech recognition (ASR) technology. For example, a text result corresponding to the sound signal is acquired. A manner of performing the voice recognition on the received sound signal to obtain the voice recognition result, a form of the voice recognition result and the like are not limited in the disclosure.

As shown in FIG. 1, in S12, one or more keywords in the voice recognition result are determined.

For example, the mobile phone of the user may determine the one or more keywords in the voice recognition result. For example, word segmentation processing may be performed on the voice recognition result (for example, the text result) to obtain the one or more keywords in the voice recognition result. For example, the voice recognition result is "how is the indoor air quality". The mobile phone of the user may perform word segmentation on the voice recognition result. For example, the mobile phone may segment the voice recognition result into three words of "indoor", "air quality" and "how", and determines the three words as the keywords in the voice recognition result. The manner for determining the keywords in the voice recognition result, the number of keywords, the form and the type of the keywords and the like are not limited in the disclosure.

In a possible implementation, the keywords may include one or more of a keyword for characterizing an intention, a keyword for characterizing an application range and a keyword for characterizing basic information.

For example, a voice control instruction sent by the user may include a word relevant to an operation intention, and the mobile phone of the user may determine and acquire the keyword for characterizing intention. For example, the voice control instruction is an instruction "sweep the bedroom". The keyword "sweep" is a keyword for characterizing intention. The voice control instruction sent by the user may include a word relevant to an application range of an operation, i.e., an execution range of the control instruction. The mobile phone of the user may determine and acquire the keyword for characterizing an application range. For example, the voice control instruction is an instruction "sweep the bedroom". The keyword "bedroom" is a keyword for characterizing an application range.

In a possible implementation, the basic information of the intelligent device may include one or more of a name, an identifier, a type, a position, a characteristic and the like of the intelligent device.

The intelligent device may be any device capable of being authorized to be controlled by the control device, and for example may include but be not limited to at least one of a sweeping robot, an air purifier, a lamp, an intelligent switch, an intelligent curtain, a washing machine, a television, an air conditioner, an intelligent socket and a loudspeaker box, which is not limited in the disclosure.

The name of the intelligent device may be a generic name of the intelligent device such as the sweeping robot, and may also be a name such as a nickname set by the user for the intelligent device. The identifier of the intelligent device may be recognition information of the intelligent device, which may be set by the user for the intelligent device and may also be the own recognition information of the intelligent device. The type of the intelligent device may be a type to which the intelligent device belongs. For example, the sweeping robot may be of a robot type and the like. The position of the intelligent device may be a position where the intelligent device is placed, which may be a relative position such as a bedroom and may also be an absolute position such as longitude and latitude. The characteristic of the intelligent device may be characteristic information of the intelligent device, which may be set by the user, such as a color, a shape and the like.

For example, the voice control instruction sent by the user may include basic information of the intelligent device, and the mobile phone of the user may determine and acquire the keyword for characterizing basic information. For example, the voice control instruction is an instruction "the sweeping robot sweeps the bedroom". The keyword "sweeping robot" may be the keyword for characterizing basic information. The form and content of the basic information, the type of the keyword and the like are not limited in the disclosure.

As shown in FIG. 1, in S13, a target intelligent device having attribute information matched with the one or more keywords is determined from intelligent devices.

Relationships between the intelligent devices and attribute information of the intelligent devices are constructed in advance, and the attribute information is used for characterizing an operation provided by the intelligent device corresponding to the attribute information.

For example, the intelligent device may provide an operation, and the attribute information of the intelligent device may characterize the operation provided by the intelligent device. For example, the operation provided by the sweeping robot may include sweeping, and the attribute information of the sweeping robot may include "sweeping". The relationships between the intelligent devices and the attribute information of the intelligent devices are constructed in advance. For example, the intelligent devices include a sweeping robot, an air purifier and a bedside lamp. The relationships between the above three intelligent devices and the attribute information of the three intelligent devices may be constructed in advance. The operation provided by each of the intelligent devices may include various forms and contents. The forms and contents of the attribute information are not limited in the present invention.

The relationships between the intelligent devices and the attribute information of the intelligent devices may be constructed in multiple forms. For example, when the user authorizes the control device to control an intelligent device, attribute information of the intelligent device is determined based on information (such as a device type and a content in a specification corresponding to the device) on the intelligent device, and a relationship between the intelligent device and the attribute information of the intelligent device is constructed. A determination manner, a determination time and the like of the relationships between the intelligent devices and the attribute information of the intelligent devices constructed in advance are not limited in the disclosure.

The operation (S13) that a target intelligent device having attribute information matched with the keywords is determined from intelligent devices may be implemented in multiple manners. For example, a to-be-controlled target intelligent device may be determined from the intelligent devices according to a matching condition between the determined keywords and attribute information corresponding to each of the intelligent devices.

For example, a matching degree between the keyword for characterizing the intention and the attribute information of each of the intelligent devices may be determined, and an intelligent device having the highest matching degree is determined as the target intelligent device. For example, the voice control instruction sent by the user is an instruction "sweep the bedroom". The determined keyword for characterizing the intention includes "sweep". For each of the intelligent devices, a matching degree between the keyword "sweep" and the attribute information corresponding to the intelligent device is determined. For example, the attribute information of only the sweeping robot in multiple intelligent devices includes "sweep", and thus the sweeping robot may be determined as the target intelligent device. In this way, the target intelligent device may be determined quickly according to the keyword for characterizing the intention and the attribute information of each of the intelligent devices.

In a possible implementation, candidate intelligent devices may also be determined according to the determined keywords and the attribute information of each of the intelligent devices, and the target intelligent device is determined from the candidate intelligent devices. For example, the intelligent devices having the attribute information including one or more determined keywords may be determined as candidate intelligent devices. The target intelligent device is determined from the candidate intelligent devices. For example, according to an execution condition of each of candidate intelligent devices within a reference time period, an intelligent device which has executed within the reference time period may be determined as the target intelligent device. Alternatively, for each of the candidate intelligent devices, a weight value of a keyword matched with attribute information which corresponds to the candidate intelligent device may be determined, and the candidate intelligent device having the attribute information matched with the keyword having the largest weight value is determined as the target intelligent device. The rules for determining the candidate intelligent devices and determining the target intelligent device from the candidate intelligent devices and the like are not limited in the disclosure.

Therefore, in a case that there are a large number of intelligent devices and a matching difficulty is large, the target intelligent device may be determined flexibly and accurately. The manner and rule for determining the target intelligent device having the attribute information matched with the keywords are not limited in the disclosure.

As shown in FIG. 1, in S14, the target intelligent device is controlled to execute an operation indicated by the voice recognition result.

For example, the mobile phone of the user may control the target intelligent device to execute an operation indicated by the voice recognition result. For example, if the target intelligent device is determined as the sweeping robot, the sweeping robot is controlled to execute the operation such as sweeping the bedroom indicated by the voice recognition result. The mobile phone of the user may further send the determined control instruction that the sweeping robot cleans the bedroom to a server, and the server sends the control instruction to the sweeping robot. Alternatively, the mobile phone of the user may directly send the control instruction to the sweeping robot (for example, the mobile phone of the user is authorized to control the sweeping robot to execute the sweeping operation) to enable the sweeping robot to execute the operation indicated by the voice recognition result. The manner of controlling the target intelligent device to execute the operation indicated by the voice recognition result is not limited in the disclosure.

Figure 2:
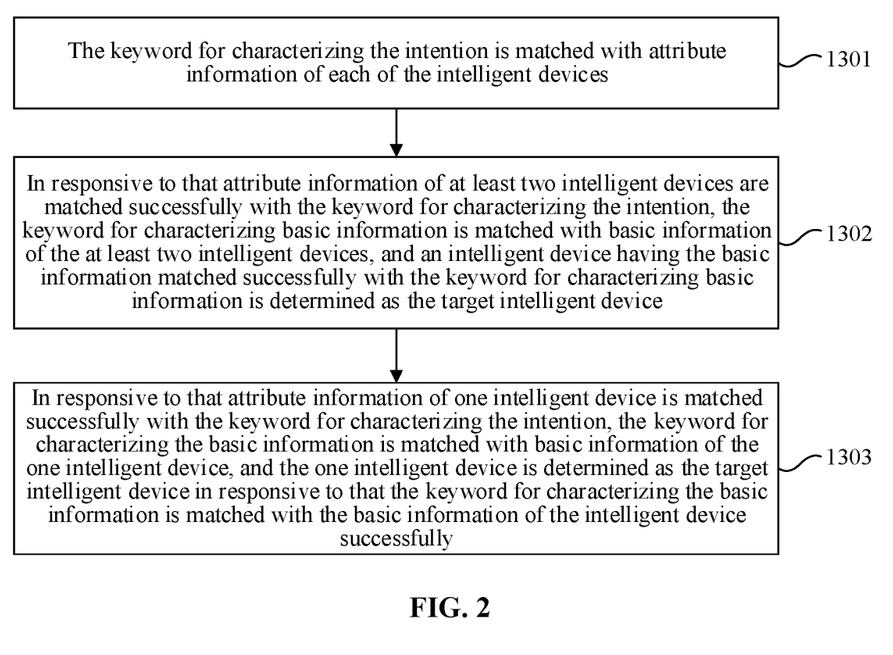
FIG. 2 is a flow chart of a method for controlling a device according to an example.

FIG. 2 is a flow chart of a method for controlling a device according to an example. In a possible implementation, as shown in FIG. 2, the operation (S13) that the target intelligent device having attribute information matched with the keywords is determined from intelligent devices may include S1301 to S1303.

At 1301, the keyword for characterizing an intention is matched with attribute information corresponding to each of the intelligent devices.

At S1302, in responsive to that attribute information of at least two intelligent devices is matched successfully with the keyword for characterizing an intention, the keyword for characterizing basic information is matched with basic information of the at least two intelligent devices. An intelligent device having basic information successfully matched with the keyword for characterizing basic information is determined as the target intelligent device.

At S1303, in responsive to that attribute information of only one intelligent device is successfully matched with the keyword for characterizing an intention, the keyword for characterizing basic information is matched with basic information of the intelligent device. If the keyword for characterizing basic information is matched with the basic information of the intelligent device successfully, the intelligent device is determined as the target intelligent device.

As mentioned above, the basic information of the intelligent device may include one or more of a name, an identifier, a type, a position and a characteristic of the intelligent device. The keywords include a keyword for characterizing an intention and a keyword for characterizing basic information, which are not repeated here anymore.

In a possible implementation, relationships between the intelligent devices and the basic information of the intelligent devices may be constructed in advance. For example, the basic information of the sweeping robot may include the name of a small hard worker, the type of a robot and the position of a living room and a bedroom. The relationship between the sweeping robot and the basic information of the sweeping robot may be constructed in advance.

When the user authorizes the control device to control an intelligent device, the basic information of the intelligent device may be determined according to information (such as a device model, a content and initial setting information in the description corresponding to the device) of the intelligent device, and a relationship between the intelligent device and the basic information of the intelligent device is constructed. A determination manner, a determination time and the like of the relationships between the intelligent devices and the basic information of the intelligent devices constructed in advance are not limited in the disclosure.

For example, the user utters a voice control instruction "please help me to query a pm2.5 value in the bedroom". The mobile phone of the user determines that the keyword for characterizing an intention may include "pm2.5 value query". The mobile phone of the user may match the keyword for characterizing the intention with attribute information corresponding to each of intelligent devices. For example, the intelligent devices that can be controlled by the mobile phone of the user include an air purifier and an intelligent loudspeaker box (for example, the attribute information corresponding to each of the air purifier and the intelligent loudspeaker box include "pm2.5 value query"). The mobile phone of the user may determine that attribute information of two intelligent devices is matched successfully with the keyword for characterizing the intention.

In some optional examples, in responsive to that attribute information of at least two intelligent devices is matched successfully with the keyword for characterizing the intention, the keyword for characterizing basic information is matched with basic information of the at least two intelligent devices, and an intelligent device having the basic information successfully matched with the keyword for characterizing the intention is determined as the target intelligent device.

For example, as mentioned above, in responsive to that the attribute information of at least two intelligent devices (such as the air purifier and the intelligent loudspeaker box) is matched successfully with the keyword for characterizing the intention, the keyword for characterizing basic information determined by the mobile phone of the user may include a keyword "bedroom". The mobile phone of the user may match the keyword "bedroom" for characterizing the basic information with the basic information of the air purifier and the basic information of the intelligent loudspeaker box. For example, the basic information of the air purifier includes "bedroom" while the basic information of the intelligent loudspeaker box does not include "bedroom". The mobile phone of the user may determine the air purifier as an intelligent device matched successfully with the keyword "bedroom", and may determine the air purifier as the target intelligent device.

In this way, in a case that multiple intelligent devices having attribute information successfully matched with the keyword for characterizing the intention are determined and acquired according to the keyword for characterizing the intention and the attribute information of each of the intelligent devices, the target intelligent device may be determined accurately and efficiently in combination with the keyword for characterizing basic information and the basic information of the above intelligent devices having attribute information successfully matched with the keyword for characterizing the intention. A manner of matching the keyword for characterizing the intention with the attribute information corresponding to each of the intelligent devices and a manner of matching the keyword for characterizing basic information with the basic information of the at least two intelligent devices are not limited in the disclosure.

In some optional examples, in responsive to that attribute information of one intelligent device is matched successfully with the keyword for characterizing the intention, the keyword for characterizing basic information is matched with basic information of the one intelligent device. If the keyword for characterizing basic information is matched with the basic information of the intelligent device successfully, the intelligent device is determined as the target intelligent device.

For example, the user utters a voice control instruction "please help me to query a pm 2.5 value in the bedroom". A keyword for characterizing an intention determined by the mobile phone of the user may include a keyword "pm2.5 value query". A keyword for characterizing basic information may include a keyword "bedroom". The mobile phone of the user may match the keyword for characterizing the intention with attribute information corresponding to each of the intelligent devices. For example, the mobile phone of the user may determine that an air purifier in the intelligent devices controlled by the mobile phone has attribute information matched successfully with the keyword for characterizing the intention, and the mobile phone of the user may match the keyword (bedroom) for characterizing the basic information with the basic information of the air purifier. For example, if the basic information of the air purifier includes "bedroom", the keyword (bedroom) for characterizing the basic information is matched successfully with the basic information of the air purifier, and the air purifier may be determined as the target intelligent device.

In this way, in response to that one intelligent device having attribute information matched successfully with the keyword for characterizing the intention is determined and acquired according to the keyword for characterizing the intention and the attribute information of each of the intelligent devices, the target intelligent device may be determined more accurately in combination with the keyword for characterizing basic information and the basic information of the above intelligent device having attribute information matched successfully with the keyword for characterizing the intention. A manner of matching the keyword for characterizing the intention with the attribute information corresponding to each of intelligent devices and a manner of matching the keyword for characterizing basic information with the basic information of the intelligent device are not limited by the disclosure.

Figure 3:
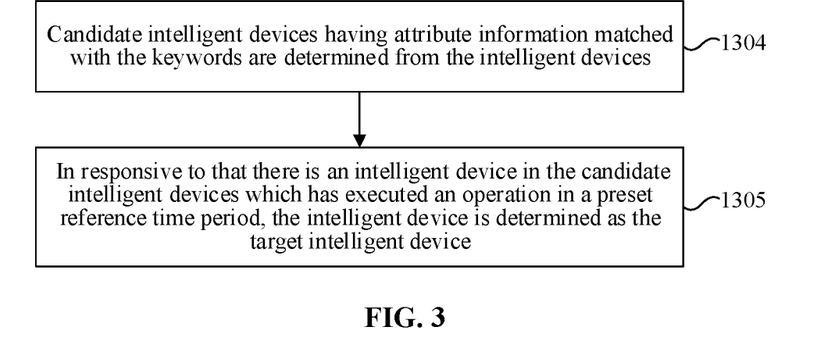
FIG. 3 is a flow chart of a method for controlling a device according to an example.

FIG. 3 is a flow chart of a method for controlling a device according to an example. In a possible implementation, as shown in FIG. 3, the operation (S13) that the target intelligent device having attribute information matched with the keyword is determined from intelligent devices may include S1304 to S1305.

At S1304, candidate intelligent devices having attribute information matched with the keywords are determined from the intelligent devices.

At S1305, in responsive to that there is an intelligent device in the candidate intelligent devices which has executed an operation in a preset reference time period, the intelligent device is determined as the target intelligent device.

The reference time period may be a time interval set in advance, e.g., a preset time period (1 minute, 5 minutes and the like) before a preset time moment, or a preset time period (1 minute, 5 minute, and the like) before a current time moment. The operation executed within the preset reference time period may be controlled by the user in various manners. For example, the user may manually perform the operation or control the operation through a voice control instruction. The operation may be any operation capable of being executed by the intelligent device. A duration of the reference time period, a manner for executing the operation and the like are not limited in the disclosure.

For example, the mobile phone of the user may determine one or more intelligent devices having attribute information matched with the keyword, and determine the one or more intelligent devices as the candidate intelligent devices. For example, intelligent devices having attribute information including at least one keyword may be determined as the candidate intelligent device. Alternatively, a matching degree between attribute information of each of the intelligent devices and the keyword may be further determined, and the candidate intelligent devices are determined according to the matching degrees. For example, the intelligent device having the matching degree greater than or equal to a matching threshold is determined as the candidate intelligent device. A manner of determining the candidate intelligent devices having the attribute information matched with the keywords, a manner for determining the matching degree, a value and a set manner of the matching threshold and the like are not limited in the disclosure.

The candidate intelligent devices may include multiple devices of the same type (such as multiple bedside lamps distributed in different bedrooms), and may also include multiple devices of different types (such as bedside lamps and televisions). For example, the mobile phone of the user receives a voice control instruction (adjust to a higher luminance) at 20:01. The mobile phone of the user may determine candidate intelligent devices from multiple intelligent devices (such as the bedside lamp, the sweeping root, the television). For example, the determined candidate intelligent devices include the bedside lamp and the television (for example, attribute information of each of the bedside lamp and the television includes "adjust to a higher luminance"). The mobile phone of the user determines that the bedside lamp is turned on at 20:00 (for example, the user turns on the bedside lamp manually). The mobile phone of the user may determine the bedside lamp in the multiple candidate intelligent devices (such as the bedside lamp and the television) that has executed an operation within the reference time period (for example, the reference time period is 1 min) as the target intelligent device.

In some optional examples, the determined candidate intelligent devices are bedside lamps distributed in different bedrooms. In combination with that the candidate intelligent device that has executed an operation within the reference time period is determined to be a bedside lamp in a master bedroom, the mobile phone of the user may determine the bedside lamp in the master bedroom as the target intelligent device.

In such way, the target intelligent device may be determined accurately, thereby improving the accuracy and an intelligent level of the voice interaction.

Figure 4:
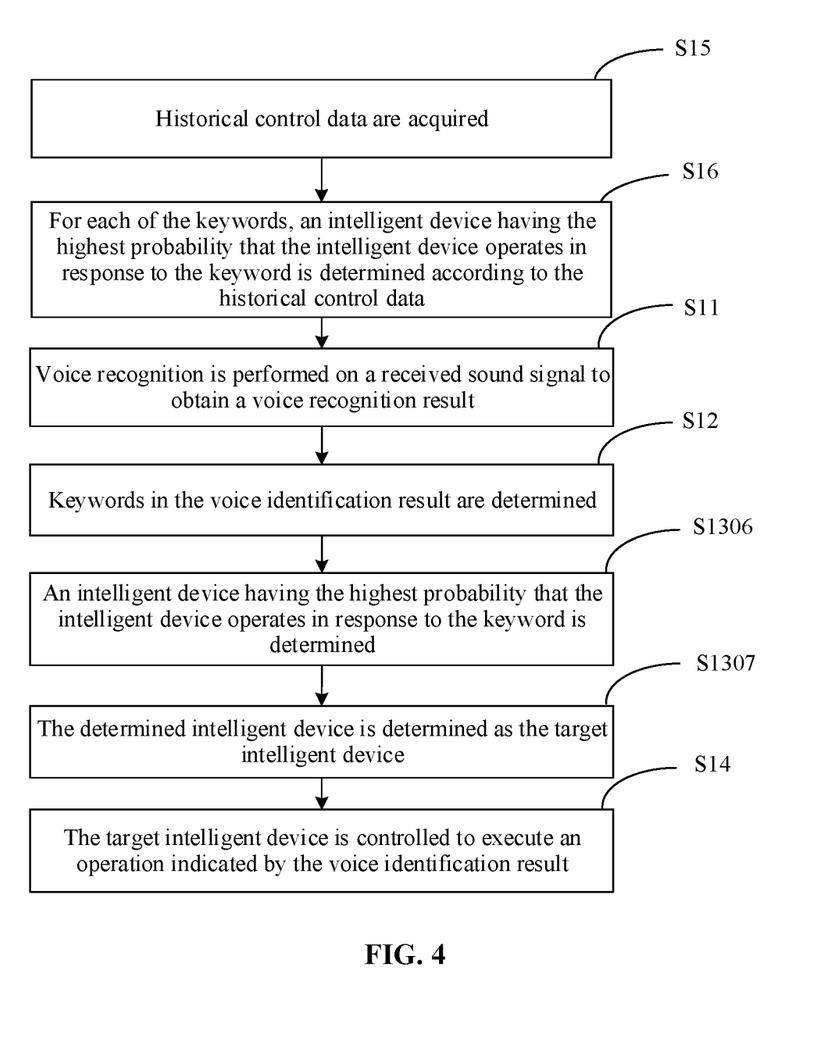
FIG. 4 is a flow chart of a method for controlling a device according to an example.

FIG. 4 is a flow chart of a method for controlling a device according to an example. In a possible implementation, as shown in FIG. 4, the method further includes S15 and S16.

At S15, historical control data is acquired. The historical control data include relationships between control instructions determined historically and intelligent devices operating in response to the control instructions, and the control instruction is any one of forms including: the voice recognition result, and at least one keyword included in the voice recognition result.

At S16, for each of the control instructions, an intelligent device having the highest probability that the intelligent device operates in response to the control instruction is determined according to the historical control data.

The operation (S13) that a target intelligent device having attribute information matched with the keywords is determined from intelligent devices may include S1306 and S1307.

At S1306, an intelligent device having the highest probability that the intelligent device operates in response to a control instruction that corresponds to the voice recognition result is determined.

At S1307, the determined intelligent device is determined as the target intelligent device.

It should be noted that operations S15 and S16 may be executed before operations S11 and S12, and may also be executed after operations S11 and S12, as long as operations S15 and S16 are executed before S1306, which is not limited in the disclosure.

A relationship between each control instruction sent historically and an intelligent device that is controlled to operate in response to the control instruction is recorded and stored, and the historical control data may include relationships between historical control instructions and intelligent devices operating in response to the historical control instructions.

Further, the control instruction may be determined according to the voice recognition result. The control instruction may be in various forms. The voice recognition result may be directly taken as the control instruction, and at least one keyword recognized from the voice recognition result is taken as the control instruction. For a case where at least one keyword is taken as the control instruction, the keyword for characterizing the intention may be taken as the control instruction. It is assumed that the voice recognition result is "the sweeper sweeps the bedroom", and the voice recognition result is used to control the sweeper to sweep, the recognition result may be taken as the control instruction to be stored in response to the sweeper. Alternatively, at least one keyword (for example, one keyword "sweep", and two keywords "sweeper sweeps" or "sweep bedroom") included in the voice recognition result is taken as the control instruction to be stored in response to the sweeper.

The control device may send the above stored data to the server for data analysis, and may also directly perform data analysis on the above data to determine the relationships between control instructions and the intelligent device operating in response to the control instructions. The historical control data containing the relationships may be stored in the control device, or may be stored in the server. The form and content of the historical control data, a determination manner, a storage manner and an acquisition manner of the historical control data and the like are not limited in the disclosure.

For example, after the user authorizes the mobile phone to control the sweeping robot, the air purifier and the bedside lamp, the user may control these intelligent devices frequently via voice interaction in daily life. For example, after the user authorizes the mobile phone to control the intelligent devices, the user frequently sends a voice control instruction "adjust a desk lamp to higher luminance". The mobile phone of the user obtains a historical voice recognition result (for example, "adjust the bedside lamp to higher luminance") by performing voice recognition on a sound signal. The keyword acquired from the historical voice recognition result may include a keyword "adjust to higher luminance" (the keyword for characterizing the intention). The mobile phone of the user may further determine that a target intelligent device corresponding to the keyword is the bedside lamp and thus determine a relationship between the keyword "adjust to higher luminance" and the bedside lamp. The mobile phone of the user may send the determined relationship to the server or store it locally.

In a possible implementation, for each of the control instructions, an intelligent device having the highest probability that the intelligent device operates in response to the control instruction may be determined according to the historical control data.

For example, the mobile phone of the user or the server may store the acquired historical control data, process the historical control data, and make a statistic and analyze an intelligent device having the highest probability that the intelligent device operates in response to each control instruction contained in the historical control data. For example, the number of keywords "adjust to higher luminance" in the historical voice recognition result in the historical control data is ten, nine keywords "adjust to higher luminance" correspond to the bedside lamp and one keyword "adjust to higher luminance" corresponds to the television (it may be determined that a frequency that the keyword "adjust to higher luminance" corresponds to the bedside lamp is higher than a frequency that the keyword corresponds to the television). The intelligent device (such as the bedside lamp) having the highest probability that the intelligent device operates in response to the keyword (adjust to higher luminance) may be determined based on the historical control data.

Therefore, for each of the control instructions, the intelligent device having the highest probability that the intelligent device operates in response to the control instruction can be determined accurately and comprehensively, an operation habit of the user can be met to a great extent, thereby continuously learning according to operation data of the user and thus perfecting the intelligent level. A manner of determining the intelligent device having the highest probability that the intelligent device operates in response to each keyword is not limited in the disclosure.

In a possible implementation, the intelligent device having the highest probability that the intelligent device operates in response to the keyword may be determined, and the determined intelligent device is determined as the target intelligent device.

For example, the mobile phone of the user may perform voice recognition on the received sound signal to obtain a voice recognition result (for example, "query a pm 2.5 value"). The mobile phone of the user may acquire the historical control data. It is assumed that the mobile phone of the user may acquire a relationship between the control instruction "query the pm 2.5 value" and the intelligent device stored historically from the server. It is also assumed that the number of the control instructions received historically by the mobile phone of the user is 20, and the intelligent device corresponding to each of nineteen control instructions of the twenty control instructions is the air purifier, and the intelligent device corresponding to one control instruction is the intelligent loudspeaker box. The mobile phone of the user may determine, according to the historical control data, an intelligent device having the highest probability that the intelligent device operates in response to the control instruction as the air purifier. The intelligent device having the highest probability that the intelligent device operates in response to the present keyword may be determined to be the air purifier, and the air purifier is determined as the target intelligent device.

Further, the present control instruction may be not consistent with the stored historical control instruction, and a historical control instruction having the highest matching degree of matching with the present control instruction may be determined as the historical control instruction corresponding to the present control instruction, and an intelligent device having the highest probability that the intelligent device operates in response to the historical control instruction is determined as an intelligent device corresponding to the present control instruction. The matching manner is not repeated herein anymore.

Therefore, the to-be-controlled target intelligent device may be determined quickly and accurately in combination with the historical control data, thereby improving the intelligent level of the voice interaction in a case of limited control information contained in the voice control instruction.

Figure 5:
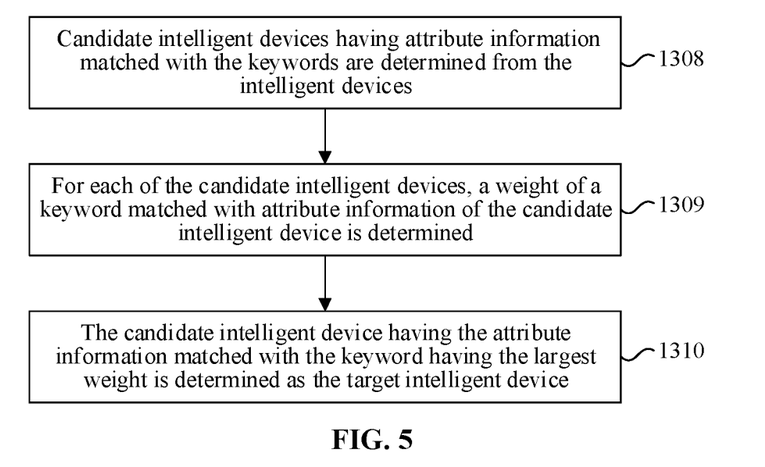
FIG. 5 is a flow chart of a method for controlling a device according to an example.

FIG. 5 is a flow chart of a method for controlling a device according to an example. In a possible implementation, as shown in FIG. 5, the operation (S13) that a target intelligent device having attribute information matched with the one or more keywords is determined from the intelligent devices may include S1308 to S1310.

At S1308, candidate intelligent devices having attribute information matched with the one or more keywords are determined from the intelligent devices.

At S1309, for each of the candidate intelligent devices, a weight of a keyword matched with the attribute information of the candidate intelligent device is determined.

At S1310, the candidate intelligent device having the attribute information matched with a keyword having the largest weight is determined as the target intelligent device.

A manner of determining the candidate intelligent devices having attribute information matched with the one or more keywords is as mentioned above and is not be repeated herein anymore.

In this example, different calculation weights may be set for the keywords, and different calculation weights may be set according to characteristics such as word properties of the keywords. For example, a high weight may be set for a verb. Alternatively, different calculation weights are set according to types of the keywords. For example, a high weight may be set for the keyword for characterizing an intention. For each of the candidate intelligent devices, a weight of a keyword matched with the attribute information of the candidate intelligent device may be determined, and the candidate intelligent device having attribute information matched with a keyword having the largest weight is determined as the target intelligent device.

For example, the mobile phone of the user performs recognition on a received sound signal to obtain a voice recognition result, and determines keywords in the voice recognition result, which include "sweep" and "mode". The keyword, a verb "sweep", is provided with a high weight such as 60%, and the keyword, a noun "mode", is provided with a small weight such as 40%. It is assumed that candidate intelligent devices having attribute information matched with the keywords may include a sweeping robot (for example, the attribute information of the sweeping robot is matched with the keyword "sweep") and an air purifier (for example, the attribute information of the air purifier is matched with the keyword "mode"). The mobile phone of the user may determine the sweeping robot having attribute information matched with the keyword (for example, sweep) having the largest weight as the target intelligent device.

In such a way, the target intelligent device may be determined from the candidate intelligent devices quickly and accurately. A manner of setting the weight of each keyword is not limited in the disclosure.

Figure 6:
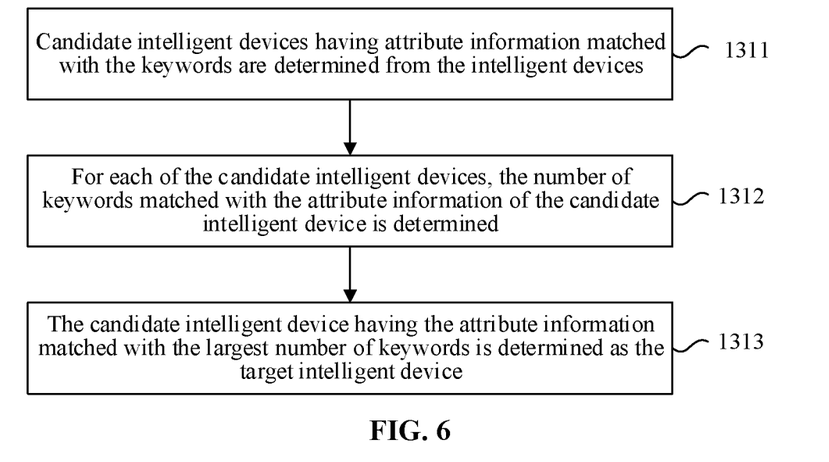
FIG. 6 is a flow chart of a method for controlling a device according to an example.

FIG. 6 is a flow chart of a method for controlling a device according to an example. In a possible implementation, as shown in FIG. 6, the operation (S13) that a target intelligent device having attribute information matched with the keywords is determined from intelligent devices may include S1311 to S1313.

At S1311, candidate intelligent devices having attribute information matched with the keywords are determined from the intelligent devices.

At S1312, for each of the candidate intelligent devices, the number of keywords matched with attribute information of the candidate intelligent device is determined.

At S1313, the candidate intelligent device having the attribute information which is matched with the greatest number of keywords is determined as the target intelligent device.

A manner of determining the candidate intelligent devices having attribute information matched with the keywords is as mentioned above and will not be repeated herein anymore.

For example, the mobile phone of the user performs recognition on a received sound signal to obtain a voice recognition result, and determines keywords in the voice recognition result and determines multiple candidate intelligent devices according to the keywords. For example, an intelligent device having attribute information containing at least one keyword may be determined as the candidate intelligent device. The mobile phone of the user may determine the number of keywords matched with the attribute information of each candidate intelligent device, and determine the candidate intelligent device having the attribute information which is matched with the greatest number of keywords as the target intelligent device.

For example, in a case where attribute information corresponding to a candidate intelligent device is matched with all of the keywords, and attribute information corresponding to other candidate intelligent devices is matched with a part of keywords, the candidate intelligent device having the attribute information which is matched with the greatest number of keywords (for example, the attribute information is matched with all keywords) may be determined as the target intelligent device. Alternatively, in a case where multiple keywords are determined and acquired, and attribute information corresponding to each of the candidate intelligent devices is matched with a part of keywords, the candidate intelligent device having the attribute information which is matched with the greatest number of keywords may be determined as the target intelligent device.

In such a manner, the target intelligent device may be determined from the candidate intelligent devices quickly and accurately. A manner and an applicable rule of determining the target intelligent device from the intelligent devices are not limited in the disclosure.

Figure 7:
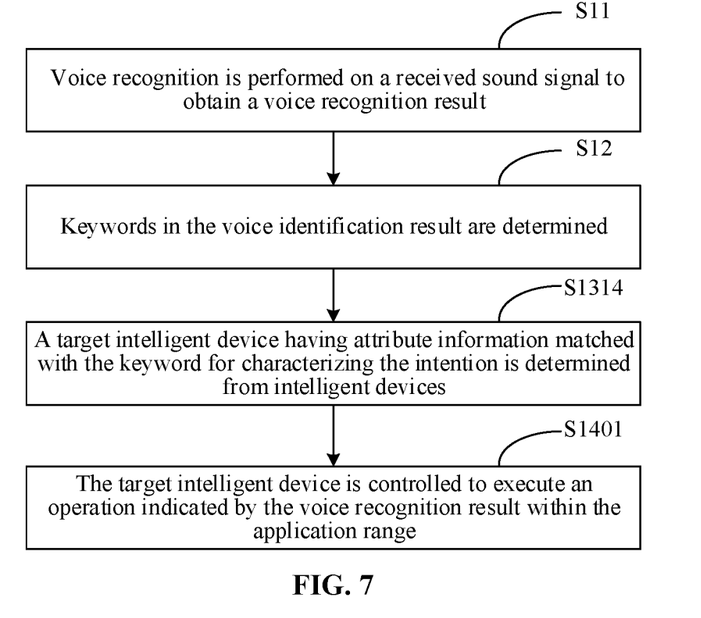
FIG. 7 is a flow chart of a method for controlling a device according to an example.

FIG. 7 is a flow chart of a method for controlling a device according to an example. In a possible implementation, as shown in FIG. 7, the operation (S13) that a target intelligent device having attribute information matched with the keywords is determined from intelligent devices may include S1314.

At S1314, a target intelligent device having attribute information matched with the keyword for characterizing the intention is determined from the intelligent devices.

As shown in FIG. 7, the operation (S14) that the target intelligent device is controlled to execute an operation indicated by the voice recognition result may include S1401.

At S1401, the target intelligent device is controlled to execute an operation indicated by the voice recognition result within the application range.

As mentioned above, the keyword for characterizing the application range may be included, and the target intelligent device having the attribute information matched with the keyword for characterizing the intention may be determined, which is not be repeated herein anymore.

For example, the mobile phone of the user performs recognition on a received sound signal to obtain a voice recognition result, and determines the keywords in the voice recognition result which include, for example, a keyword "sweep" for characterizing the intention and a keyword "master bedroom" for characterizing the application range. The mobile phone of the user may determine the target intelligent device according to the keyword "sweep" for characterizing the intention and the attribute information corresponding to each intelligent device. For example, in a case where "sweep" included in the attribute information corresponding to the sweeping robot is matched with the keyword "sweep" for characterizing the intention, the target intelligent device having the attribute information matched with the keyword for characterizing the intention is determined to be the sweeping robot. The mobile phone of the user may control the target intelligent device to execute an operation indicated by the voice recognition result within the application range. For example, in a case that that the keyword "master bedroom" for characterizing the application range is included, the mobile phone of the user may control the sweeping robot to execute a sweeping operation within the range of the master bedroom.

Therefore, an intelligent level for controlling the target intelligent device can be improved, and the operation indicated by the voice recognition result is executed within the application range, thereby ensuring the operation efficiency of the intelligent device.

APPLICATION EXAMPLE

Hereinafter, an application example according to the example of the disclosure is given in combination with an exemplary application scenario in which a user controls an intelligent device, to facilitate understanding for the flow of the method for controlling the device. It should be understood by those skilled in the art that the following application example is merely for the purpose of facilitating understanding for the examples of the disclosure and should be not regarded as a limit to the examples of the disclosure.

Figure 8:
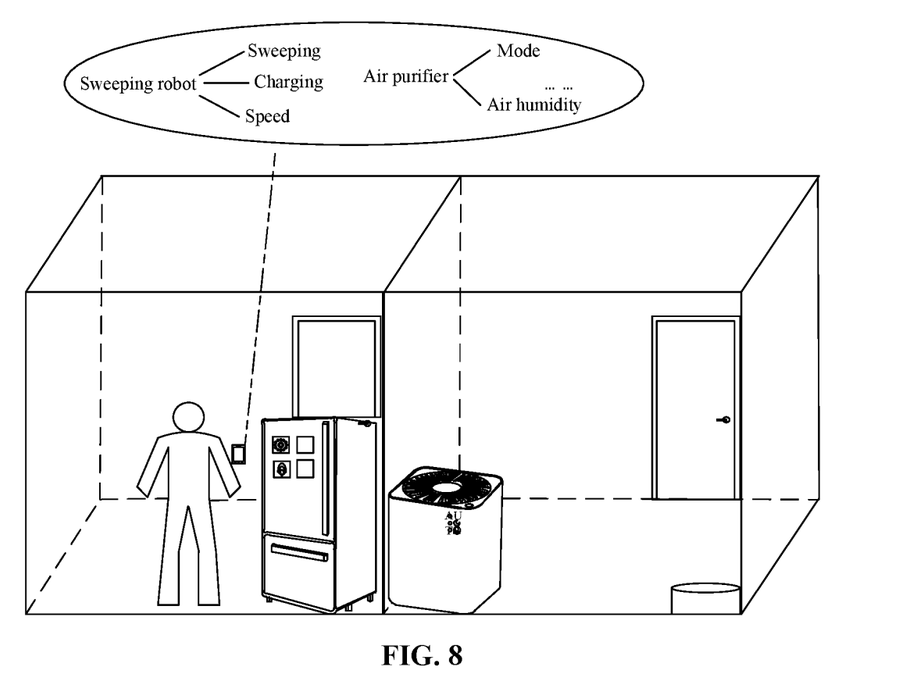
FIG. 8 is a schematic diagram showing an application scenario of a method for controlling a device according to an example.

FIG. 8 is a schematic diagram showing an application scenario of a method for controlling a device according to an example. In this application example, a user authorizes a mobile phone to control a sweeping robot, an air purifier and the like (intelligent devices). In this application example, the mobile phone of the user may determine and store attribute information of the sweeping robot and the air purifier. For example, the attribute information of the sweeping robot may include sweeping, charging, a speed and the like. The attribute information of the air purifier may include a mode, air humidity and the like.

In this application example, the user utters a voice control instruction to the mobile phone in a room, such as "how much the air humidity is". The mobile phone of the user performs voice recognition on a received sound signal to obtain a voice recognition result (for example, the voice recognition result is a text content "how much the air humidity is"). The mobile phone of the user determines keywords in the voice recognition result. For example, the keywords include "air humidity" and "how much". The mobile phone of the user determines a target intelligent device having attribute information matched with the keywords from the intelligent devices according to the keywords and attribute information of the intelligent devices. For example, in a case where it is determined according to the stored attribute information of each intelligent device that the attribute information corresponding to the air purifier includes information "air humidity", the mobile phone of the user may determine the air purifier as the to-be-controlled target intelligent device.

In this application example, the mobile phone of the user may control the air purifier to execute the operation indicated by the voice recognition result. For example, as shown in FIG. 8, the mobile phone of the user may control an air purifier disposed in another room to be started and determine the air humidity.

Figure 9:
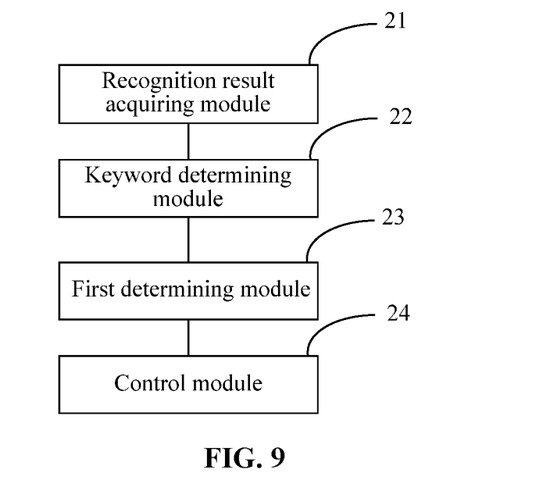
FIG. 9 is a block diagram of an apparatus for controlling a device according to an example.

FIG. 9 is a block diagram of an apparatus for controlling a device according to an example. Referring to FIG. 9, the apparatus includes a recognition result acquiring module 21, a keyword determining module 22, a first determining module 23 and a control module 24.

The recognition result acquiring module 21 is configured to perform recognition on a received sound signal to obtain a voice recognition result.

The keyword determining module 22 is configured to determine keywords in the voice recognition result.

The first determining module 23 is configured to determine a target intelligent device having attribute information matched with the keywords from intelligent devices.

Relationships between the intelligent devices and attribute information of the intelligent devices are constructed in advance, and the attribute information is used for characterizing an operation provided by the intelligent device corresponding to the attribute information.

The control module 24 is configured to control the target intelligent device to execute an operation indicated by the voice recognition result.

Figure 10:
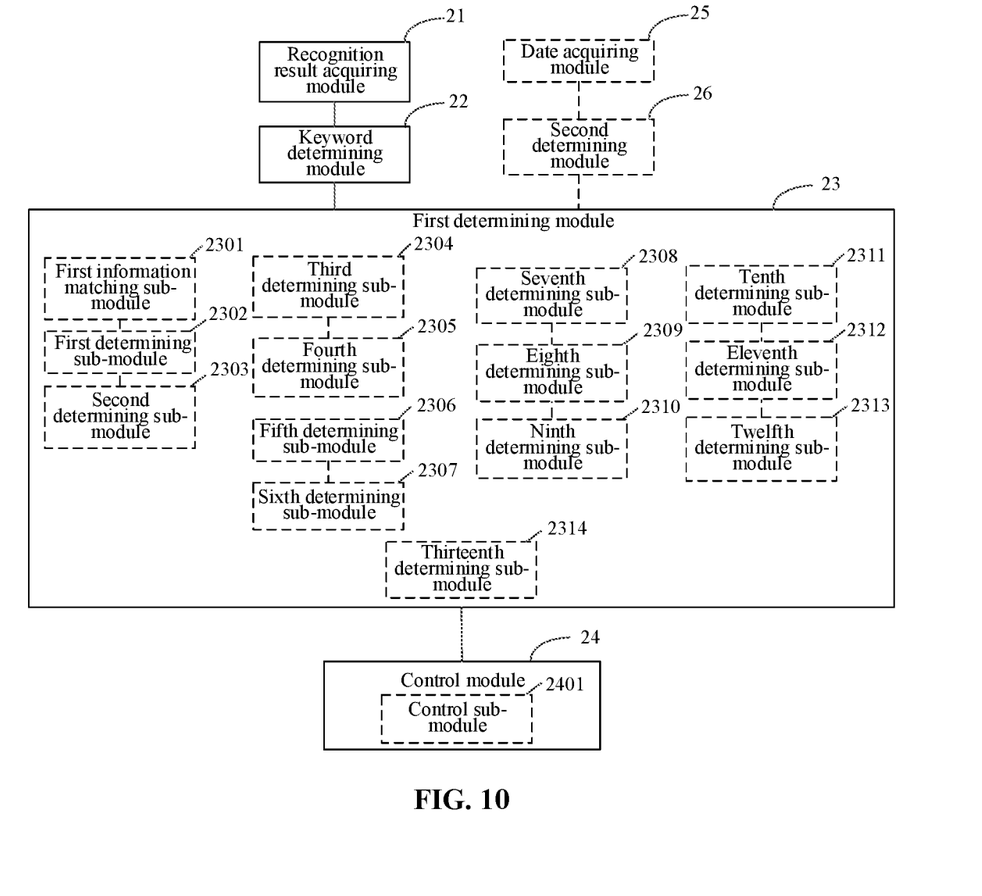
FIG. 10 is a block diagram of an apparatus for controlling a device according to an example.

FIG. 10 is a block diagram of an apparatus for controlling a device according to an example. Referring to FIG. 10, in a possible implementation, relationships between the intelligent devices and basic information of the intelligent devices are constructed in advance. The basic information includes one or more of the following information: a name, an identifier, a type, a position and a characteristic of the intelligent device. The keywords include a keyword for characterizing an intention and a keyword for characterizing basic information.

The first determining module 23 includes a first information matching sub-module 2301, a first determining sub-module 2302 and a second determining sub-module 2303.

The first information matching sub-module 2301 is configured to match a keyword for characterizing the intention with attribute information corresponding to each of the intelligent devices.

The first determining sub-module 2302 is configured to match, in responsive to that attribute information of at least two intelligent devices are matched successfully with the keyword for charactering the intention, a keyword for characterizing basic information with basic information of the at least two intelligent devices, and determine an intelligent device having the basic information matched successfully with the keyword for characterizing basic information as the target intelligent device.

The second determining sub-module 2303 is configured to match, in responsive to that attribute information of one intelligent device is matched successfully with the keyword for charactering the intention, a keyword for characterizing basic information with basic information of the intelligent device, and determine, in responsive to that the keyword for characterizing basic information is matched with the basic information of the intelligent device successfully, the intelligent device as the target intelligent device.

Referring to FIG. 10, in a possible implementation, the first determining module 23 includes a third determining sub-module 2304 and a fourth determining sub-module 2305.

The third determining sub-module 2304 is configured to determine candidate intelligent devices having attribute information matched with the keywords from intelligent devices.

The fourth determining sub-module 2305 is configured to determine, in responsive to that there is an intelligent device out of the candidate intelligent devices which has executed an operation in a preset reference time period, the intelligent device as the target intelligence device.

Referring to FIG. 10, in a possible implementation, the apparatus further includes a data acquiring module 25 and a second determining module 26.

The data acquiring module 25 is configured to acquire historical control data. The historical control data includes relationships between control instructions determined historically and intelligent devices which operate in response to the control instructions. The control instruction is any one of the voice recognition result, and at least one keyword included in the voice recognition result.

The second determining module 26 is configured to, for each of the control instructions, determine, according to the historical control data, an intelligent device having the highest probability that the intelligent device operates in response to the control instruction.

The first determining module 23 includes a fifth determining sub-module 2306 and a sixth determining sub-module 2307.

The fifth determining sub-module 2306 is configured to determine an intelligent device having the highest probability that the intelligent device operates in response to a control instruction that corresponds to the voice recognition result.

The sixth determination sub-module 2307 is configured to determine the determined intelligent device as the target intelligent device.

Referring to FIG. 10, in a possible implementation, the first determining module 23 includes a seventh determining sub-module 2308, an eighth determining sub-module 2309 and a ninth determining sub-module 2310.

The seventh determination sub-module 2308 is configured to determine candidate intelligent devices having attribute information matched with the keywords from intelligent devices.

The eighth determination sub-module 2309 is configured to, for each of the candidate intelligent devices, determine a weight of a keyword matched with attribute information of the candidate intelligent device.

The ninth determination sub-module 2310 is configured to determine a candidate intelligent device having attribute information matched with a keyword having the largest weight as the target intelligent device.

Referring to FIG. 10, in a possible implementation, the first determining module 23 includes a tenth determining sub-module 2311, an eleventh determining sub-module 2312 and a twelfth determining sub-module 2313.

The tenth determining sub-module 2311 is configured to determine candidate intelligent devices having attribute information matched with the keywords from intelligent devices.

The eleventh determining sub-module 2312 is configured to, for each of the candidate intelligent devices, determine the number of keywords matched with attribute information of the candidate intelligent device.

The twelfth determining sub-module 2313 is configured to determine the candidate intelligent device having the attribute information which is matched with the greatest number of keywords as the target intelligent device.

Referring to FIG. 10, in a possible implementation, the keywords include a keyword for characterizing an intention and a keyword for characterizing an application range.

The first determining module 23 includes a thirteenth determining sub-module 2314.

The thirteenth determining sub-module 2314 is configured to determine a target intelligent device having attribute information matched with the keyword for characterizing the intention from the intelligent devices.

The control module 24 includes a control sub-module 2401.

The control sub-module 2401 is configured to control the target intelligent device to execute an operation indicated by the voice recognition result within the application range.

Regarding the devices in the above examples, the implementations for performing operations by individual modules have been described in detail in the method examples, which are not be elaborated herein.

Figure 11:
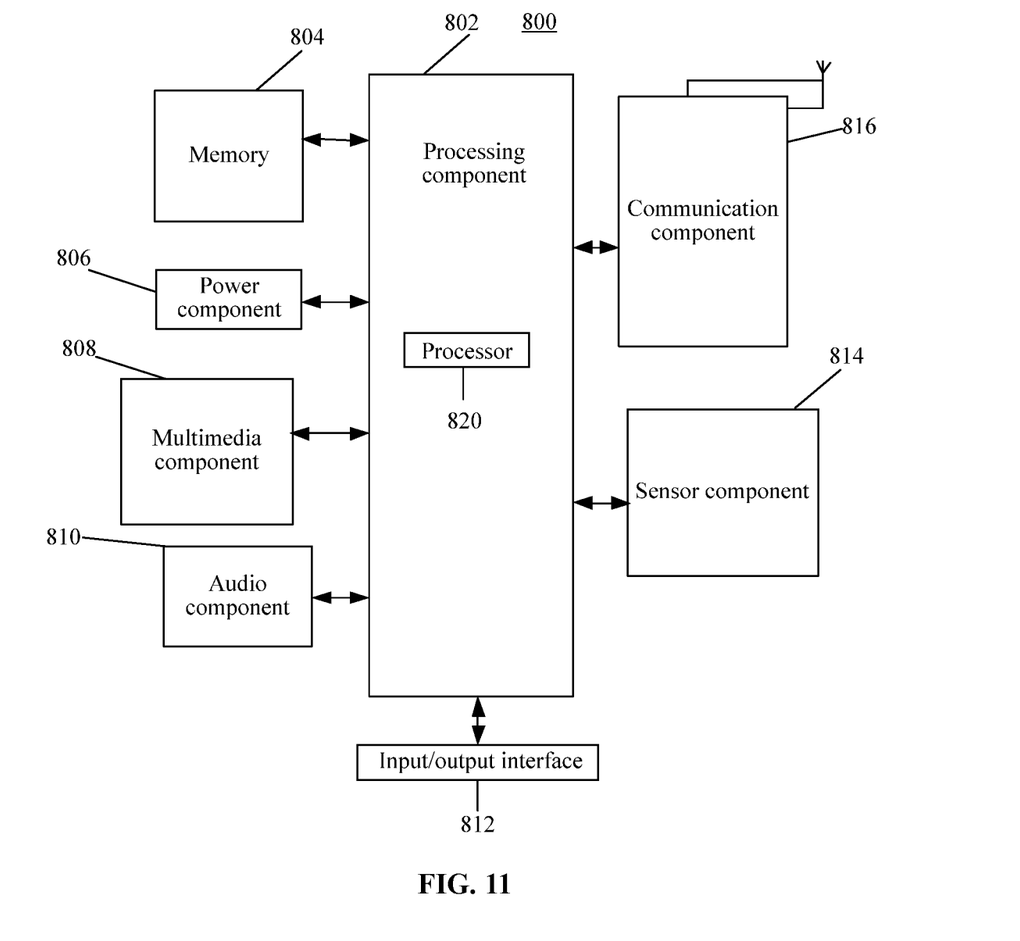
FIG. 11 is a block diagram of an apparatus for controlling a device according to an example.

FIG. 11 is a block diagram of an apparatus for controlling a device according to an example. For example, the apparatus 800 may be a mobile phone, a computer, a digital broadcast terminal, a messaging device, a gaming console, a tablet, a medical device, fitness equipment, a personal digital assistant, and the like.

Referring to FIG. 11, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or a part of the steps in the above described methods. Moreover, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support the operation of the apparatus 800. Examples of such data include instructions for any applications or methods operated on the apparatus 800, contact data, telephone book data, messages, pictures, video and the like. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power to various components of the apparatus 800. The power component 806 may include a power management system, one or more power sources, and other components associated with the generation, management, and distribution of power for the apparatus 800.

The multimedia component 808 includes a screen providing an output interface between the apparatus 800 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touching, sliding, and gestures on the touch panel. The touch sensors may not only sense a boundary of a touching or sliding action, but also sense a period of time and a pressure associated with the touching or sliding operation. In some examples, the multimedia component 808 includes a front camera and/or a rear camera. The front camera and the rear camera may receive external multimedia datum in a case that the apparatus 800 is in an operation mode, such as a photographing mode or a video mode. Each of the front camera and the rear camera may be a fixed optical lens system or have a focus length and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and a peripheral interface module. The above peripheral interface module may be a keyboard, a click wheel, a button, and the like. The button may include, but be not limited to, a home button, a volume button, a starting button, and a locking button.

The sensor component 814 includes one or more sensors configured to provide status assessments for the apparatus 800 in various aspects. For example, the sensor component 814 may detect an open/closed status of the apparatus 800 and positioning of components, for example, the component is the display and the keypad of the apparatus 800. The sensor component 814 may also detect a change in position of the apparatus 800 or a component of the apparatus 800, contact or non-contact of a user with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a complementary metal oxide semiconductor (CMOS) or charge-coupled device (CCD) image sensor, which is used in imaging applications. In some examples, the sensor component 814 may also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 can access a wireless network based on a communication standard, such as wireless fidelity (WiFi), the 2rd generation (2G), or 3th generation (3G), or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a blue-tooth (BT) technology, and other technologies.

In examples, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, a non-transitory computer-readable storage medium including instructions, such as the memory 804 including instructions, is further provided. The above instructions may be executable by the processor 820 in the apparatus 800, for performing the above-described methods. For example, the non-transitory computer-readable storage medium may be a read-only memory (ROM), a read access memory (RAM), a compact disk-read only memory (CD-ROM), a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the disclosure are easily conceivable for those skilled in the art from consideration of the specification and with practice of the disclosure disclosed here. The disclosure is intended to cover any variations, usages or adaptations of the disclosure which conform to the general principles thereof and includes common general knowledge and conventional technical means in the technical field not disclosed in the disclosure. The specification and the examples are only considered as exemplary, and a scope and the spirit of the disclosure are indicated by the following claims.

It should be understood that the present disclosure is not limited to the exact construction described above and illustrated in the accompanying drawings, and various modifications and changes can be made without departing from the scope thereof. The scope of the disclosure is only limited by the appended claims.

The invention claimed is:

1. A method for controlling a device, comprising:
performing voice recognition on a received sound signal to obtain a voice recognition result;
determining one or more keywords using the voice recognition result;
determining a target intelligent device having attribute information that is matched with the one or more keywords from intelligent devices,
wherein relationships between the intelligent devices and attribute information of the intelligent devices are constructed in advance, and the attribute information characterizes a device operation provided by the intelligent device corresponding to the attribute information; and
controlling the target intelligent device to perform an operation indicated by the voice recognition result,
wherein determining the target intelligent device having attribute information matched with the one or more keywords from the intelligent devices comprises:
determining candidate intelligent devices having attribute information matched with the one or more keywords from the intelligent devices;
for each of the candidate intelligent devices, determining a weight of a keyword matched with the attribute information of the candidate intelligent device, wherein weights are set according to word properties of the keywords or types of the keywords, the word properties of the keywords comprise a verb and a noun, and the types of the keywords comprises a keyword for characterizing an intention, different word properties or different types of the keywords have different weights; and
determining the candidate intelligent device having attribute information matched with the keyword having a largest weight as the target intelligent device.

2. An apparatus for controlling a device, comprising:
a processor; and
a memory configured to store processor-executable instructions,
wherein the processor is configured to:
perform voice recognition on a received sound signal to obtain a voice recognition result;
determine one or more keywords using the voice recognition result;
determine a target intelligent device having attribute information matched with the one or more keywords from intelligent devices,
wherein relationships between the intelligent devices and attribute information of the intelligent devices are constructed in advance, and the attribute information characterizes a device operation provided by the intelligent device corresponding to the attribute information; and
control the target intelligent device to perform an operation indicated by the voice recognition result,
wherein the processor is further configured to:
determine candidate intelligent devices having attribute information matched with the one or more keywords from the intelligent devices;
for each of the candidate intelligent devices, determine a weight of a keyword matched with the attribute information of the candidate intelligent device, wherein weights are set according to word properties of the keywords or types of the keywords, the word properties of the keywords comprise a verb and a noun, and the types of the keywords comprises a keyword for characterizing an intention, different word properties or different types of the keywords have different weights; and
determine the candidate intelligent device having attribute information matched with the keyword having a largest weight as the target intelligent device.

3. A non-transitory computer readable storage medium, wherein instructions stored in the non-transitory computer readable storage medium, when being executed by a processor, cause the processor to perform:

performing voice recognition on a received sound signal to obtain a voice recognition result;

determining one or more keywords using the voice recognition result;

determining a target intelligent device having attribute information that is matched with the one or more keywords from intelligent devices, wherein relationships between the intelligent devices and attribute information of the intelligent devices are constructed in advance, and the attribute information characterizes a device operation provided by the intelligent device corresponding to the attribute information; and controlling the target intelligent device to perform an operation indicated by the voice recognition result, wherein the instructions caused the processor to perform determining the target intelligent device having attribute information matched with the one or more keywords from the intelligent devices further cause the processor to perform:

determining candidate intelligent devices having attribute information matched with the one or more keywords from the intelligent devices;

for each of the candidate intelligent devices, determining a weight of a keyword matched with the attribute information of the candidate intelligent device, wherein weights are set according to word properties of the keywords or types of the keywords, the word properties of the keywords comprise a verb and a noun, and the types of the keywords comprises a keyword for characterizing an intention, different word properties or different types of the keywords have different weights; and determining the candidate intelligent device having attribute information matched with the keyword having a largest weight as the target intelligent device.

* * * * *